Jan. 20, 1925.
V. SQUIRES
CORN PLANTER
Filed Feb. 12, 1924
1,523,730
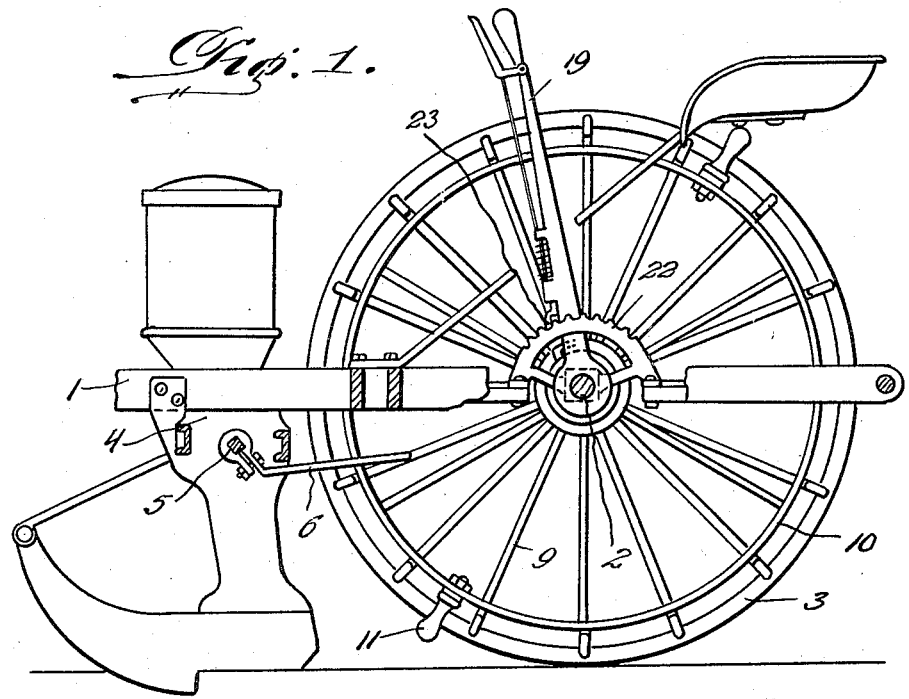
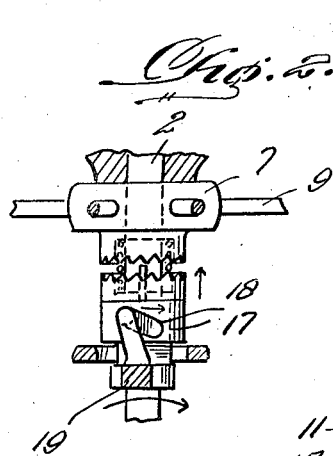
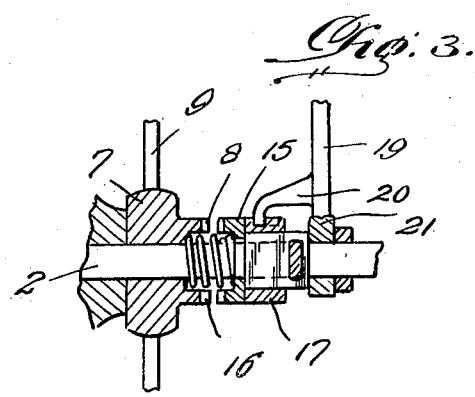
Vernon Squires,
Inventor
By Clarence A. O'Brien
Attorney Patented Jan. 20, 1925.

1,523,730

UNITED STATES PATENT OFFICE.

VERNON SQUIRES, OF HURLEY, SOUTH DAKOTA.

CORN PLANTER.

Application filed February 12, 1924. Serial No. 692,307.

*To all whom it may concern:*

Be it known that VERNON SQUIRES, citizen of the United States, residing at Hurley, in the county of Turner and State of South Dakota, has invented certain new and useful Improvements in Corn Planters, of which the following is a specification.

This invention relates to wireless corn planters and it consists in the novel features hereinafter described and claimed.

An object of the invention is to provide an attachment adapted to be applied to a corn planter and which will enable the same to be operated as a wireless corn planter to effect the planting at regular intervals apart and to provide means for making marks in the soil where the plantings occur in order that the corn may be deposited in the soil in check row so that the crop may be cultivated by passing the cultivator in rectangular directions across the field.

The planter to which the attachment is applied consists of a frame having ground engaging wheels supporting the same and a seed carrying and dropping mechanism mounted thereon. A trip member is mounted upon the shaft which operates the seed dropping mechanism. A clutch member is loosely mounted upon the axle shaft of the planter and spokes radiate from the said clutch member. The spokes carry at their outer ends an annular band upon which markers are mounted and arms are attached to the markers and the band and are adapted to engage the trip member as the band rotates whereby the seed dropping mechanism of the planter is actuated. After the seed has been dropped and approximately at the time that it is being covered by the ground engaging wheels of the planter, the marker enters the soil and makes a depression therein and the depression indicates approximately the point at which the planting has taken place. A lever actuated clutch mechanism is mounted upon the axle shaft and may be manipulated to engage the said clutch member whereby the clutch member and the rim are fixed with relation to the axle shaft.

In the accompanying drawing:—

Figure 1 is a longitudinal sectional view of the planter with parts broken away.

Figure 2 is a horizontal sectional view showing the clutch mechanism.

Figure 3 is a vertical sectional view of the clutch mechanism.

Figure 4 is a detailed view of the marker and the arms with parts thereof shown in section.

The planter to which the attachment is applied is of conventional type and includes a frame 1 having an axle shaft 2 journaled thereon and ground engaging wheels 3 fixed to the axle shaft in a usual manner. The planter also includes a seed dropping and carrying means indicated in general at 4 and the said means includes a shaft 5 which is adapted to actuate the seed dropping mechanism (not shown). A trip member 6 is fixed to the shaft 5 and its free end portion is disposed rearwardly.

A clutch hub 7 is loosely journaled upon the shaft 2 and is provided with clutch teeth 8. Spokes 9 radiate from the clutch member 7 and carry at their outer ends a circular band 10, the diameter of which is less than the diameter of the ground engaging wheels 3. Knobs 11 are mounted at intervals upon the periphery of the band 10 and their shanks 12 pass through the band and are secured by means of bolts 13 which bear against the inner surface of the band. Arms 14 are mounted upon the exterior surface of the band 10 and the shanks 12 of the knobs 11 pass through the end portion of the said arms 14. The free end portion of the trip member 6 lies in the path of movement of the arms 14. A clutch member 15 is splined upon the axle shaft 2 and a spring 16 is interposed between the clutch hub 7 and the clutch member 15 and is under tension with a tendency to normally hold the clutch member 15 out of engagement with the teeth 8 of the clutch hub 7. A collar 17 is loosely mounted upon the axle shaft 2 and is provided with a cam slot 18. The slot 18 is generally disposed transversely with relation to the axle shaft 2. A lever 19 is pivoted upon the axle shaft 2 and is provided with an arm 20 having an angularly disposed extremity 21 which is located in the cam slot 18 of the sleeve 17.

Therefore it will be seen that when the lever 19 is swung, the spring 16 may be compressed and the clutch member 15 is moved into engagement with the teeth of the clutch hub 7 and consequently the said clutch hub 7 is fixed with relation to the axle shaft 2 and rotates with the same. A dentate segment 22 is mounted upon the frame 1 and the lever 19 carries a spring pressed pawl 23 which is adapted to engage between the teeth of the segment 22 and hold the lever 19 at an adjusted position.

When the clutch member 15 is moved into engagement with the clutch hub 7 and the planter is progressing over a field, the arms 14 strike the free end portion of the trip member 6 and turn the shaft 5 whereby the seed is dropped from the seed retaining means 4 and is deposited in the soil. As the machine continues to progress, the wheel 3 covers the seed which has been dropped in the soil, in a usual manner, and at the same time, the marker knob 11 enters the soil and makes a depression therein, the said depression being approximately at the point where the need is deposited in the soil. These markings may be observed by the operator of the machine and consequently he is in a position to judge and know when the plantings that are being made are in check row alinement with previous plantings of the seed which have been made in the soil.

Therefore the plantings are effected in check row alinement and when the plants are growing, they stand in rows which are alined in rectangular directions and consequently the standing crop may be cultivated in either of two directions and in the same manner as though the planting had been effected by the use of a wire and reel or similar apparatus which is usually employed for such purpose.

Having thus described the invention, what is claimed is:

In combination with a planter, an axle therefor, a seed dropping shaft, a trip arm mounted upon the seed dropping shaft, a band concentrically arranged with respect to the axle of the planter and journaled thereon, means for fixing the band with relation to the axle, an arm positioned upon the peripheral surface of the band and disposed transversely thereof and having an end portion projecting beyond the side edge of the band, and a radially disposed knob having a shank passing transversely through the arm and the band, and a securing device applied to the inner end portion of the knob shank and disposed at the inner surface of the band.

In testimony whereof he affixes his signature.

VERNON SQUIRES.